United States Patent
Rychlik et al.

(10) Patent No.: US 9,465,735 B2
(45) Date of Patent: Oct. 11, 2016

(54) SYSTEM AND METHOD FOR UNIFORM INTERLEAVING OF DATA ACROSS A MULTIPLE-CHANNEL MEMORY ARCHITECTURE WITH ASYMMETRIC STORAGE CAPACITY

(71) Applicant: Qualcomm Incorporated, San Diego, CA (US)

(72) Inventors: Bohuslav Rychlik, San Diego, CA (US); Feng Wang, San Diego, CA (US); Anwar Rohillah, San Diego, CA (US); Simon Booth, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 434 days.

(21) Appl. No.: 14/045,784

(22) Filed: Oct. 3, 2013

(65) Prior Publication Data

US 2015/0100746 A1   Apr. 9, 2015

(51) Int. Cl.
G06F 12/06   (2006.01)

(52) U.S. Cl.
CPC ................... *G06F 12/0607* (2013.01)

(58) Field of Classification Search
CPC ................................................ G06F 12/0607
See application file for complete search history.

(56) References Cited

U.S. PATENT DOCUMENTS

| | | | |
|---|---|---|---|
| 5,341,486 A * | 8/1994 | Castle | G06F 12/0607 711/157 |
| 7,114,040 B2 | 9/2006 | Yoder | |
| 7,552,280 B1 * | 6/2009 | Naamad | G06F 3/0611 711/114 |
| 8,095,735 B2 | 1/2012 | Brewer et al. | |
| 8,266,408 B2 | 9/2012 | Iyer et al. | |
| 2005/0246508 A1 | 11/2005 | Shaw | |
| 2005/0289317 A1 * | 12/2005 | Liou | G06F 13/1684 711/170 |
| 2007/0022261 A1 | 1/2007 | Young | |
| 2008/0250212 A1 | 10/2008 | Asaro et al. | |
| 2009/0150710 A1 | 6/2009 | Bilger et al. | |
| 2010/0115233 A1 * | 5/2010 | Brewer | G06F 9/30036 712/7 |
| 2011/0047346 A1 | 2/2011 | Cypher et al. | |

OTHER PUBLICATIONS

International Search Report and Written Opinion—PCT/US2014/058946—ISA/EPO—Dec. 9, 2014 (134083WO).

* cited by examiner

*Primary Examiner* — Reginald Bragdon
*Assistant Examiner* — Mehdi Namazi
(74) *Attorney, Agent, or Firm* — Smith Tempel

(57) ABSTRACT

Systems and methods for uniformly interleaving memory accesses across physical channels of a memory space with a non-uniform storage capacity across the physical channels are disclosed. An interleaver is arranged in communication with one or more processors and a system memory. The interleaver identifies locations in a memory space supported by the memory channels and is responsive to logic that defines virtual sectors having a desired storage capacity. The interleaver accesses the asymmetric storage capacity uniformly across the virtual sectors in response to requests to access the memory space.

43 Claims, 8 Drawing Sheets

SYSTEM AND METHOD FOR UNIFORM INTERLEAVING OF DATA ACROSS A MULTIPLE-CHANNEL MEMORY ARCHITECTURE WITH ASYMMETRIC STORAGE CAPACITY

DESCRIPTION OF THE RELATED ART

Computing devices are ubiquitous. These devices may include portable computers, desktop computers and server computers and other devices of various sizes. In addition to the primary function of these devices, many include peripheral functions. For example, a cellular telephone may include the primary function of enabling and supporting cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the computing or processing power required and the data storage capacity to support such functionality also increases.

Some conventional computing device designs include multiple processors and/or processors with multiple cores to support the various primary and peripheral functions desired for a particular computing device. With the increased computing capacity and processor speed a number of techniques have been developed to minimize bottlenecks that can occur between the processors and/or processor cores and the system memory. One approach includes integrated circuit architectures that exchange data with a random access memory element twice in each clock cycle. For example, double data rate (DDR) random access memory (RAM) modules support these data exchanges. Even with this approach, today's systems with multiple processors and/or multiple cores operate at clock rates that exceed the data transfer rates of conventional memory modules. Other approaches include adding additional memory channels. A system that includes two memory channels can help to alleviate the problem by doubling the available memory bandwidth. The two channels are used simultaneously by a memory controller to alleviate data transfer bottlenecks that can occur when writing data to and reading data from a RAM module.

When each memory channel communicates with a similarly constructed (i.e., matched) memory module with equal storage capacity, not only can the controller transfer data to and from the memory space at the maximum data rate supported by the memory bus, the entire memory space is available to the memory controller to place application programs, or data files at any unused and desired location in the memory space. Thus, uniform interleaving or distribution of the data across the available address space is desired.

For conventional data interleaving schemes the storage capacity of the memory module(s) must be the same for the interleaver to access the memory modules at the maximum supported data transfer rate. This is generally not a problem as memory module manufacturers provide integrated circuits with fixed storage capacities. As long as the manufacturer of the computing device deploys memory modules in pairs, with each pair having the same storage capacity, the storage capacity accessible by each memory channel is the same.

However, computing device manufacturers have communicated the desire to provide a system memory capacity that is not a multiple of the minimum storage capacity of a commercially available memory module. This makes it impossible to use commercially available memory modules and to arrange the same in a symmetric capacity across two or more memory channels. For example, if a manufacturer desires a system memory capacity of 768 Mbytes and the smallest memory module capacity available is 256 Mbytes, a manufacturer can achieve the total memory capacity desired by deploying three memory modules. However, only two of the three modules can be symmetrically arranged across separate memory channels.

Asymmetric memory capacities present an arrangement where a first portion of the total memory capacity can only be accessed in a non-interleaved manner at a reduced data rate than that of a second portion of the total memory capacity that can be accessed using a conventional interleaving function. Such an arrangement introduces complications on the operating system and/or application providers to identify what functions and applications can be sufficiently supported by a non-interleaved (i.e., slower) data access.

Thus, there is a need for improved mechanisms for optimizing data transfer rates between memory channels that support asymmetric memory capacities.

SUMMARY OF THE DISCLOSURE

Systems and methods are disclosed that identify when a memory space supported by a multiple channel memory architecture is populated with non-uniform data storage capacities across the multiple channels. In response, a number of virtual sectors of equal storage capacity are identified. Thereafter, an interleaving function is used to distribute data accesses to the memory space across the virtual sectors.

An example embodiment includes a computing device with an interleaver disposed in communication with a processor and a system memory. The interleaver identifies locations in a memory space in the system memory. The memory space is supported by at least two physical channels and includes at least one memory module coupled to each of the physical channels. The memory space has a non-uniform storage capacity distributed across the physical channels. The interleaver is responsive to logic that identifies virtual sectors having a desired storage capacity. In operation, the interleaver accesses the asymmetric storage capacity uniformly across the virtual sectors in response to requests to access the memory space.

One example embodiment is a computing device that includes a mechanism that identifies when a memory space is arranged with a non-uniform storage capacity across a multiple-channel memory access architecture, further identifies a number of virtual sectors of desired storage capacity in the memory space, and applies an interleaving function that uniformly accesses the virtual sectors in response to requests to access the memory space.

Another example embodiment is a method for uniformly interleaving memory accesses across physical channels of a memory space with a non-uniform storage capacity. The method includes the steps of identifying when a multiple-channel memory architecture is provided an asymmetric storage capacity across the multiple channels, identifying a number of virtual sectors of equal capacity and applying an interleaving function via an interleaver that accesses the asymmetric storage capacity uniformly across the virtual sectors in response to requests to access the memory space.

Another example embodiment is a non-transitory processor-readable medium having stored therein processor instructions and data that direct the processor to: receive an indication that a multiple-channel memory architecture is presently populated with memory modules that provide an asymmetric storage capacity across the multiple channels, in response to the indication, identify a number of virtual sectors of equal capacity and apply an interleaving function that accesses the asymmetric storage capacity uniformly across the virtual sectors in response to requests to access the memory space.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
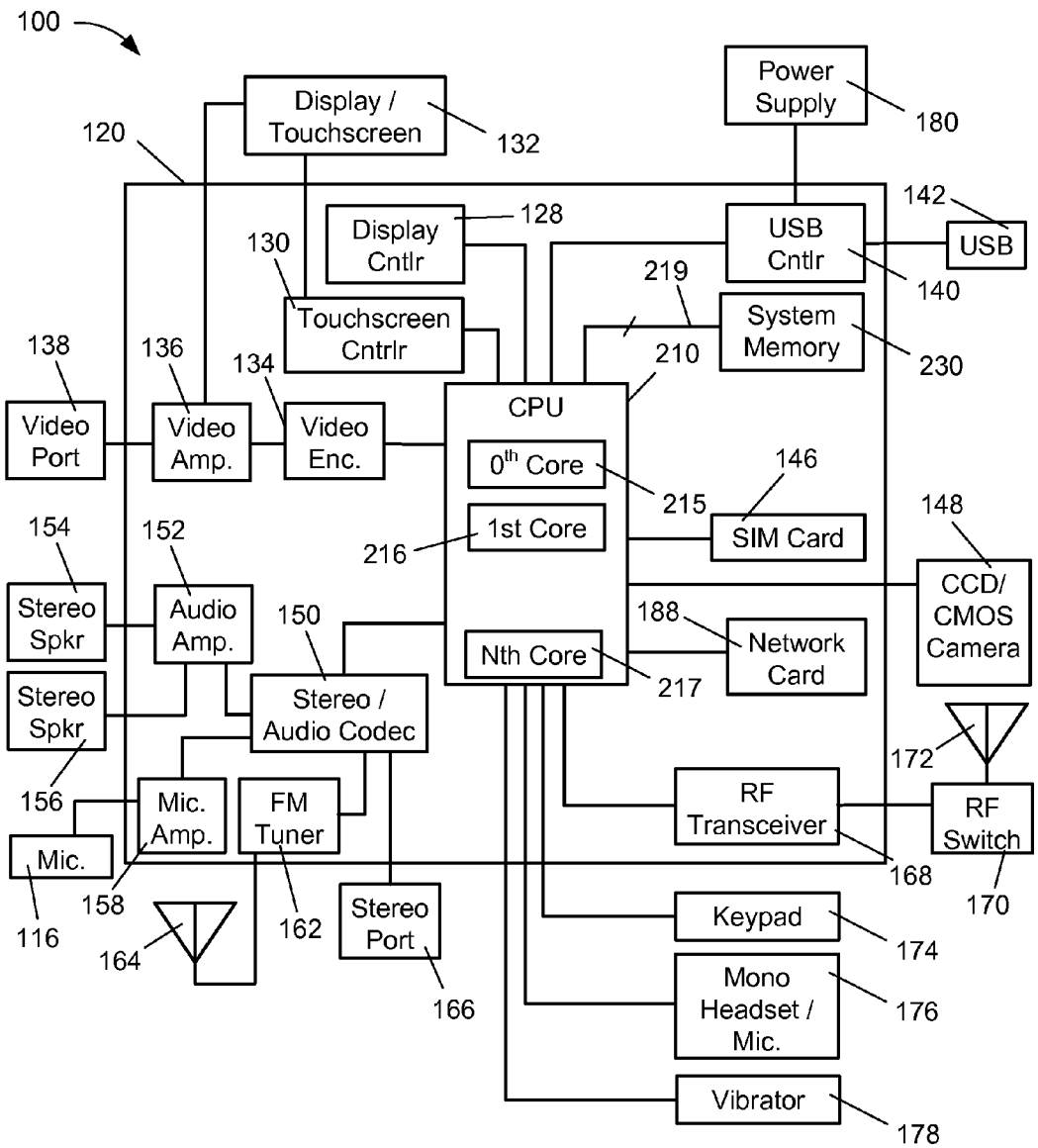
FIG. 1 is a schematic diagram illustrating an example embodiment of a computing device.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files or data values that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "portable computing device" ("PCD") is used to describe any device operating on a limited capacity rechargeable power source, such as a battery and/or capacitor. Although PCDs with rechargeable power sources have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop or tablet computer with a wireless connection, among others.

Interleaving functions can be adapted to support various configurations of memory modules deployed across multiple physical channels. A uniformly interleaved memory space will support memory accesses at a reduced data transfer rate than the data transfer rate otherwise possible when each physical channel is coupled to the same storage capacity.

Under certain conditions, the reduced data transfer rate or memory access bandwidth may be sufficient to meet or exceed desired system performance. Otherwise, when it is desired to achieve the memory access bandwidth that is possible with a uniform storage capacity across the multiple physical channels, an algorithmic approach is implemented in combination with the interleaving function to achieve an equivalent memory access bandwidth of a symmetrically arranged memory space.

When the memory space is populated with N (an integer) memory modules having the same data storage capacity, a spreading function directs an interleaver to distribute the data across the virtual sectors. An example interleaving function such as the MOD function may be deployed in an interleaver. For example, to spread the address A[7:0] over 3 channels to map a total of 192 memory words, where each channel has 6-bit address ranges [5:0], mapping 64 memory words each, the outcome of A[7:0] MOD 3, can be used to select a channel. Hence, each channel will receive exactly a third of the 192 possible valid address patterns of A[7:0] in an interleaved manner. (Note that addresses 193 to 255 are invalid address patterns because that memory is unpopulated.) Then, a set of 5-bit intra-channel addressing functions A0, A1, A2 can be defined to select the memory locations within each channel. Since the subset of 64 memory locations of A[7:0] possible within each channel is known, one ordinarily skilled in the art using standard logic design and minimization techniques can design similar intra channel addressing functions that map these 64 addresses to the 64 unique memory locations within each channel.

In another example, an interleaving function may be applied that distributes data across the virtual sectors over multiple conceptual rounds, though the actual interleaving function could be designed as a single stage using standard logic design and minimization techniques. In an example arrangement with two memory modules removed from a single channel of a 4-channel memory architecture, a desired number of bits/bytes are stored over the 3 populated channels in a round-robin fashion over multiple generations. A first portion of the bits/bytes are directed to a specified storage location in a memory module coupled to the first channel. A second portion of the bits/bytes to be stored are directed to a specified storage location in a memory module coupled to the second channel. A third portion of the bits/bytes to be stored are directed to a specified storage location in a memory module coupled to the third channel. The leftover bits/bytes that would otherwise be directed to a memory element coupled to the fourth channel when the fourth channel is coupled to memory modules can be directed to a specified storage location in a memory module coupled to the first channel and so on. Accordingly, the stored data is evenly spread across the available data storage capacity provided by memory modules coupled to 3 channels. The illustrated embodiments include other example arrangements of a memory space having non-uniform data storage capacities across multiple channels.

Although described with particular reference to operation within a PCD, the described memory management systems and methods are applicable to any computing system with a multiple channel memory architecture that is populated with a non-uniform data storage capacity across the respective channels. Stated another way, the memory management systems and methods are applicable to desktop computers, server computers or any electronic device with a non-uniformly distributed data storage capacity coupled to multiple physical channels.

Reference is now directed to the illustrated examples. Referring initially to FIG. 1, an exemplary, non-limiting aspect of a portable computing device (PCD) is shown and is generally designated 100. As shown, the PCD 100 includes an on-chip system 120 that includes a multicore CPU 210. The multicore CPU 210 includes a zero$^{th}$ core 215, a 1$^{st}$ or first core 216, and an N$^{th}$ core 217.

As illustrated in FIG. 1, a display controller 128 and a touch screen controller 130 are coupled to the multicore CPU 210. In turn, display/touchscreen 132, external to the on-chip system 120, is coupled to the display controller 128 and the touch screen controller 130.

FIG. 1 further indicates that a video encoder 134, e.g., a phase alternating line (PAL) encoder, a sequential couleur a memoire (SECAM) encoder, or a national television system(s) committee (NTSC) encoder, is coupled to the multicore CPU 210. Further, a video amplifier 136 is coupled to the video encoder 134 and the display/touchscreen 132. Also, a video port 138 is coupled to the video amplifier 136. As depicted in FIG. 1, a universal serial bus (USB) controller 140 is coupled to the multicore CPU 210. Also, a USB port 142 is coupled to the USB controller 140. A system memory 230 and a subscriber identity module (SIM) card 146 may also be coupled to the multicore CPU 210 with the connection 219 between the multicore CPU 210 and the system memory 230 consisting of two or more physical channels or paths for transferring data between these elements of the on-chip system 120. Further, as shown in FIG. 1, a digital camera 148 may be coupled to the multicore CPU 210. In an exemplary aspect, the digital camera 148 is a charge-coupled device (CCD) camera or a complementary metal-oxide semiconductor (CMOS) camera.

As further illustrated in FIG. 1, a stereo audio CODEC 150 may be coupled to the multicore CPU 210. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 116 may be coupled to the microphone amplifier 158. In a particular aspect, a frequency modulation (FM) radio tuner 162 may be coupled to the stereo audio CODEC 150. Also, a FM antenna 164 is coupled to the FM radio tuner 162. Further, a stereo port 166 may be coupled to the stereo audio CODEC 150.

FIG. 1 also indicates that a radio frequency (RF) transceiver 168 is coupled to the multicore CPU 210. An RF switch 170 may be coupled to the RF transceiver 168 and an RF antenna 172. As shown in FIG. 1, a keypad 174 is coupled to the multicore CPU 210. Also, a mono headset with a microphone 176 may be coupled to the multicore CPU 210. Further, a vibrator device 178 may be coupled to the multicore CPU 210. FIG. 1 further shows that a power supply 180 may be coupled to the on-chip system 120 via the USB controller 140. In a particular aspect, the power supply 180 is a direct current (DC) power supply that provides power to the various components of the PCD 100 that require power. Further, in a particular aspect, the power supply is a rechargeable DC battery or a DC power supply that is derived from an alternating current (AC) to DC transformer that is connected to an AC power source.

FIG. 1 further indicates that the PCD 100 may also include a network card 188 that may be used to access a data network, e.g., a local area network, a personal area network, or any other network. The network card 188 may be a Bluetooth network card, a WiFi network card, a personal area network (PAN) card, or any other network card well known in the art. Further, the network card 188 may be incorporated in an integrated circuit. That is, the network card 188 may be a full solution in a chip, and may not be a separate network card 188.

As depicted in FIG. 1, the display/touchscreen 132, the video port 138, the USB port 142, the camera 148, the first stereo speaker 154, the second stereo speaker 156, the microphone 116, the FM antenna 164, the stereo port 166, the RF switch 170, the RF antenna 172, the keypad 174, the mono headset 176, the vibrator 178, and the power supply 180 are external to the on-chip system 120.

RF transceiver 168, which may include one or more modems, may support one or more of global system for mobile communications ("GSM"), code division multiple access ("CDMA"), wideband code division multiple access ("W-CDMA"), time division synchronous code division multiple access ("TDSCDMA"), long term evolution ("LTE"), and variations of LTE such as, but not limited to, FDB/LTE and PDD/LTE wireless protocols.

In the illustrated embodiment, a single instance of a multi-core CPU 210 is depicted. However, it should be understood that any number of similarly configured multi-core CPUs can be included to support the various peripheral devices and functions associated with the PCD 100. Alternatively, a single processor or multiple processors each having a single arithmetic logic unit or core could be deployed in a PCD or other computing devices to support the various peripheral devices and functions associated with the PCD 100 as may be desired.

The illustrated embodiment shows a system memory 230 that is arranged within a fully integrated on-chip system 120. However, it should be understood that two or more vendor provided memory modules having a corresponding data storage capacity of M bytes may be arranged external to the on-chip system 120. When arranged external to the on-chip system 120, the various memory modules supporting the system memory 230 are coupled to the CPU 210 by way of a modified multiple channel memory bus (not shown) including suitable electrical connections for transferring data and power to the memory modules.

In a particular aspect, one or more of the method steps described herein may be enabled via a combination of data and processor instructions stored in the system memory 230. These instructions may be executed by the multicore CPU 210 in order to perform the methods described herein. Further, the multicore CPU 210, the memory 230, an EEPROM (not shown) or a combination thereof may serve as a means for storing a non-transitory representation of memory management logic, including interleaver logic, and configuration parameters for executing one or more of the method steps described herein. As indicated, a memory controller or other memory management logic identifies when the system memory 230 is populated in an asymmetric manner with respect to multiple memory access channels that communicate data between the CPU 210 and the system memory 230. As also indicated, interleaver logic responds in accordance with the physical architecture supporting the system memory 230 by defining virtual sectors having equal storage capacity and in response to requests to access the memory space, applying an algorithmic solution to distribute data uniformly across the virtual sectors.

Figure 2:
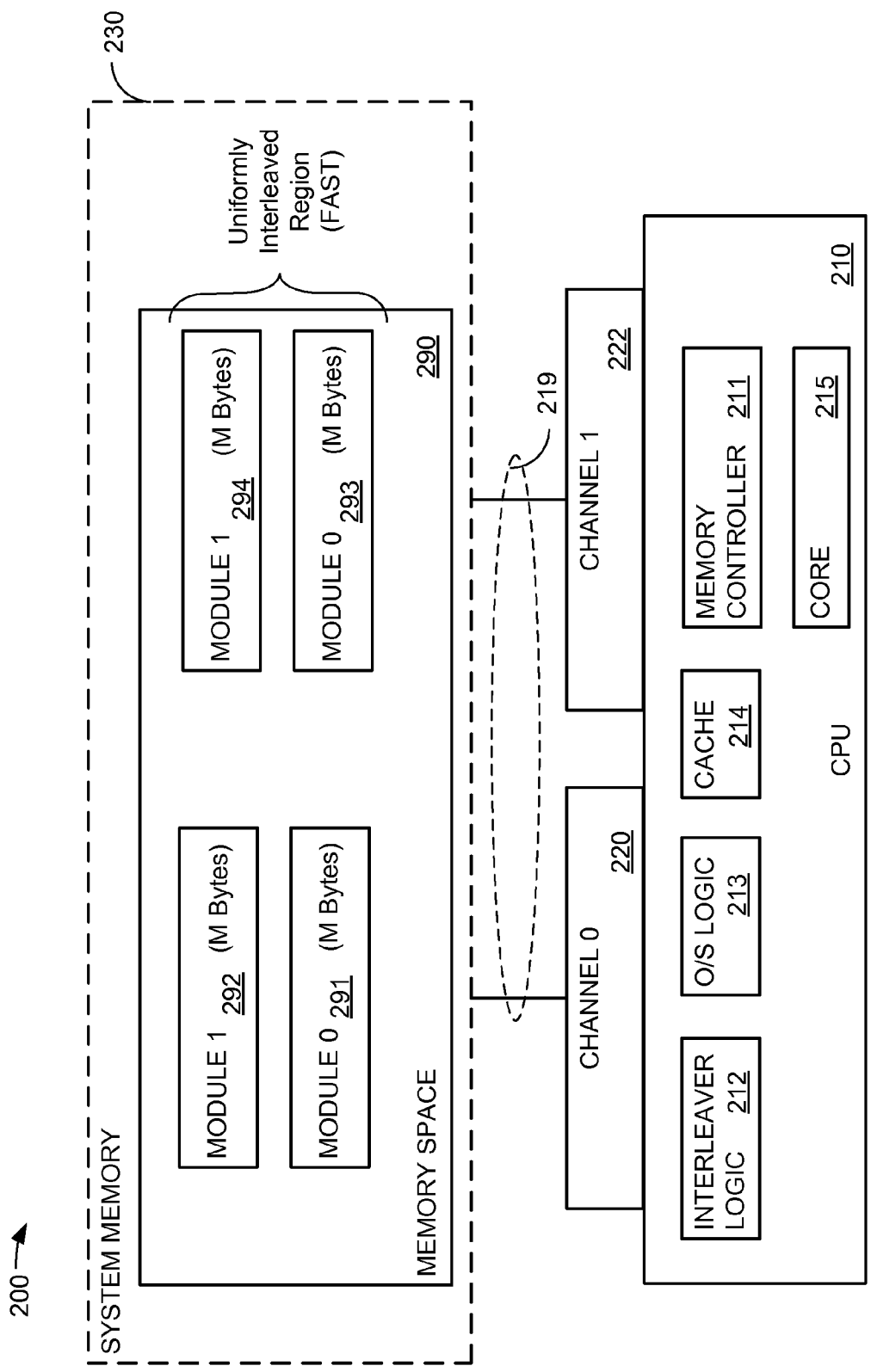
FIG. 2 is schematic diagram illustrating an example embodiment of the computing device of FIG. 1 with a symmetric memory capacity.

FIG. 2 is schematic diagram illustrating details of the CPU 210, the system memory 230 and the connection 219 that enables data transfers between the CPU 210 and the memory space 290 when the memory space 290 is supported with a symmetric memory capacity across two physical channels. As indicated in FIG. 2, the memory space 290 is supported by a first set of two memory modules coupled to the CPU 210 via channel 220 (channel 0) and a second set of two memory modules coupled to the CPU 210 via channel 222 (channel 1). The first set of memory modules includes memory module 291 and memory module 292. The memory module 291 and the memory module 292, which may be implemented with dynamic random access memory (DRAM) integrated circuits, each provide a data storage capacity of M bytes. The second set of memory modules includes memory module 293 and memory module 294. The memory module 293 and the memory module 294, which may be implemented with DRAM integrated circuits, also provide a data storage capacity of M bytes. With each of the memory modules 291-294 including the same circuit architecture and having the same capacity of M bytes, the O/S logic 213 can use the memory controller 211 to place data to be stored to any desired location across the memory space 290. Not only can the data stored therein be placed as desired by the memory controller 211, the data can be transferred to the memory space 290 of 4M bytes at the maximum bandwidth and with a uniform latency.

As indicated in FIG. 2, the CPU 210 includes a memory controller 211, interleaver logic 212, operating system (O/S) logic 213, cache 214 and core 215. These elements are coupled to each other along one or more internal connections or data buses (not shown) within the CPU 210. The memory controller 211 is a digital circuit which manages the flow of data going to and from the system memory 230. The memory controller 211 is assisted or augmented by the interleaver logic 212. The interleaver logic 212 provides an address, label or other information that identifies which of the available channels is to be used for a particular I/O operation between the CPU 210 and the system memory 230. The interleaver logic typically also rearranges or recomputes the sub-channel address being sent to each channel, in a manner that is compatible with the interleaving function. (For example, a trivial two-channel interleaver for a system with a 32-bit address A[31:0] might use address bit A[10] to select the channel, and then generate intra-channel addresses A0[A[31:11], A[9:0]] and A1[31:11], A[9:0]] for channels 0 and 1, respectively.) The O/S logic 213 includes a set of instructions that when executed by the core 215 manages the various peripheral resources and provides common services for computer programs stored in the memory space 290. The O/S/logic 213 can be stored in the system memory 230 and read into the CPU 210 as required. Alternatively, the O/S logic 213 can be stored in a read-only memory module coupled to or integrated in the CPU 210. The cache 214 is a smaller, faster memory used by the CPU 210 to store copies of the data from frequently used system memory locations. The cache 214 reduces the average time to access memory. As long as some memory accesses are from cached memory locations, the average latency of memory accesses will be closer to the cache latency than to the latency of system memory 230. The core 215 includes a set of circuits that read, buffer and execute program instructions.

In the illustrated arrangement, the memory controller 211 is integrated on the same die as the CPU 210. In alternative arrangements, the memory controller 211 can be implemented on a separate integrated circuit in communication with the CPU 210. The memory controller 211 is arranged with a front-end portion and a back-end portion. The front-end portion buffers requests and responses and provides an interface to the CPU 210 and other portions of the computing device 200 (not shown). This front-end portion is generally independent of the memory module type. In contrast, the back-end portion provides an interface to the memory modules and is dependent on the type of memory circuit in the memory modules.

In the illustrated arrangement, the interleaver logic 212 is integrated on the same die and depicted as a separate circuit or set of circuits as the core 215 and the memory controller 211. In alternative embodiments, the interleaver logic 212 may be a sub-part of the circuits that enable one of the memory controller 211 or the O/S logic 213. However embodied, the interleaver logic 212 when presented with a full complement or at least a balanced complement of addressable memory modules uses the channel 220 and the channel 222 to uniformly distribute data to be stored in the memory space 290.

Figure 3:
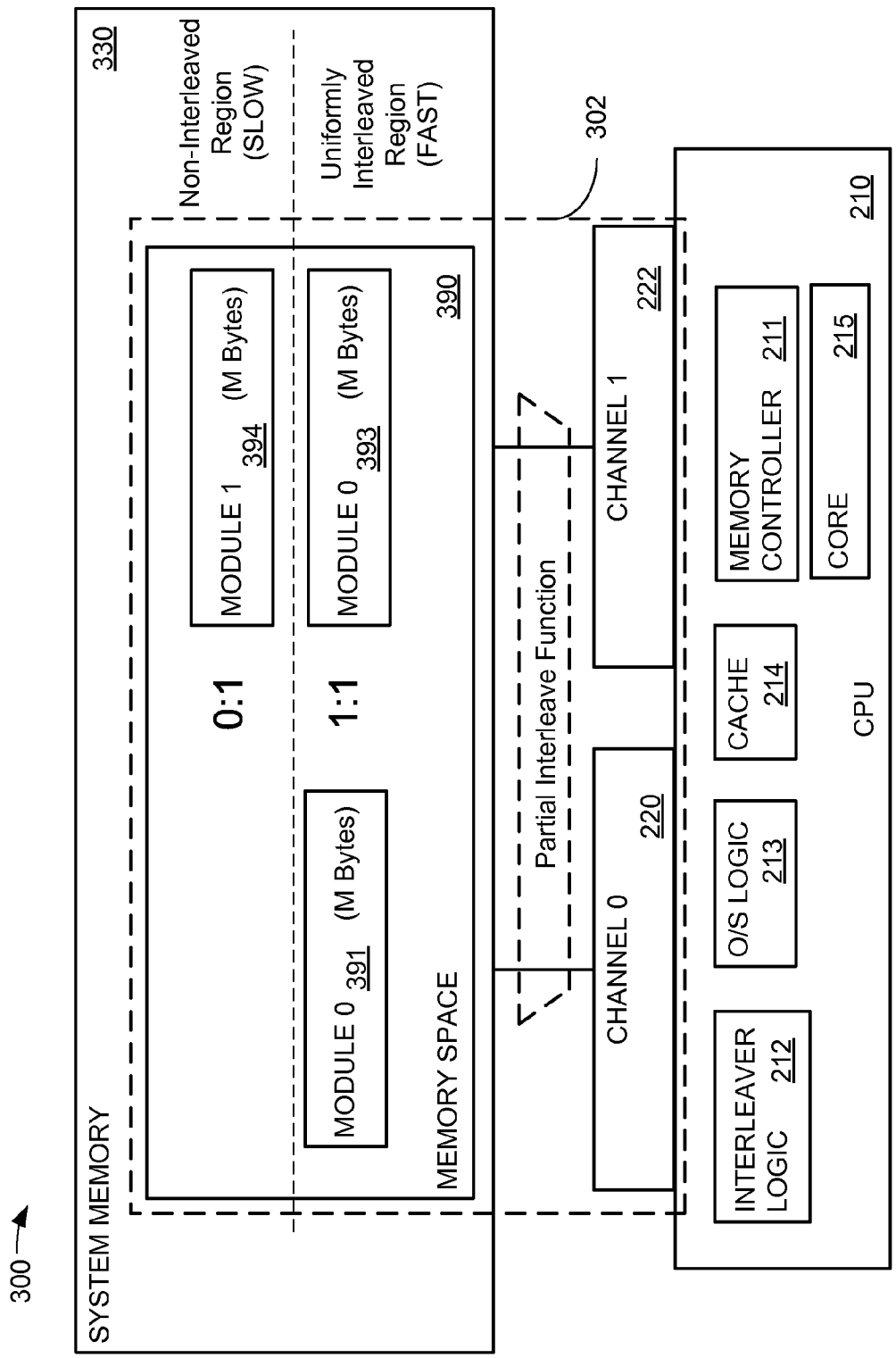
FIG. 3 is a schematic diagram illustrating the computing device of FIG. 2 with an asymmetric system memory capacity.

FIG. 3 is a schematic diagram illustrating the computing device of FIG. 2 with an asymmetric system memory capacity. An asymmetric system memory capacity occurs when the manufacturer elects to provide less than a full complement of memory modules or when a memory module fails. As indicated in the example embodiment illustrated in FIG. 3, the memory space 390 is supported by a first memory module 391 coupled to the CPU 210 via channel 220 (channel 0) and two memory modules coupled to the CPU 210 via channel 222 (channel 1). The memory module 391, memory module 393, and the memory module 394 may be implemented with DRAM integrated circuits each having a data storage capacity of M bytes. With each of the memory modules 291, 293, 294 including the same circuit architecture and having the same capacity of M bytes, the channel 220 (channel 0) is coupled to M bytes whereas the channel 222 (channel 1) is coupled to 2M bytes. As indicated in FIG. 3 there is a 1:1 data access ratio between the physical channels 220, 222 across the memory module 391 and the memory module 393. The absence of a second memory module coupled to the channel 220 results in a 0:1 data access ratio between the physical channels 220, 222. That portion of the memory space 390 supported by the memory module 394 is incapable of receiving interleaved data and thus processes less data per unit time than that portion of the memory space where two memory modules can be accessed simultaneously via respective channels. The absence of the second memory module coupled to the channel 220 may be detectable by the memory controller 211, which may communicate a signal indicating the same to the interleaver logic 212 or other logic accessible to the CPU 210. In response, the interleaver logic 212 or other logic may respond in a pre-programmed manner based on one or more system parameters. Alternatively, the computing device 300 may respond in a fixed manner.

A multiple-channel memory access architecture 302 arranged with an asymmetric storage capacity across the physical channels 220, 222 can be made operational by a partial or non-uniform interleaving function. That is, a first portion of the memory space 390 (the lowermost portion in the illustrated embodiment) can be interleaved at the maximum data rate supported by the memory module 391 and the memory module 393, while a second portion of the memory space 390 can only process non-interleaved memory access requests. Thus, the interleaver logic 212 is used to transfer data to and from the memory space over 2M bytes of the total 3M storage capacity.

While supportable, such an arrangement introduces a significant burden on the O/S logic 213 and/or application programs (not shown) that use services provided by the O/S logic 213 under circumstances where not all memory accesses can be sufficiently supported at the non-interleaved data transfer rate. When this is the case, it is incumbent on the O/S logic 213 and/or application programs to identify which memory accesses can be addressed to the non-interleaved portion of the memory space 390. Alternatively, the computing device 300 could send all memory I/O at the non-interleaved or slower data transfer rate.

Figure 4:
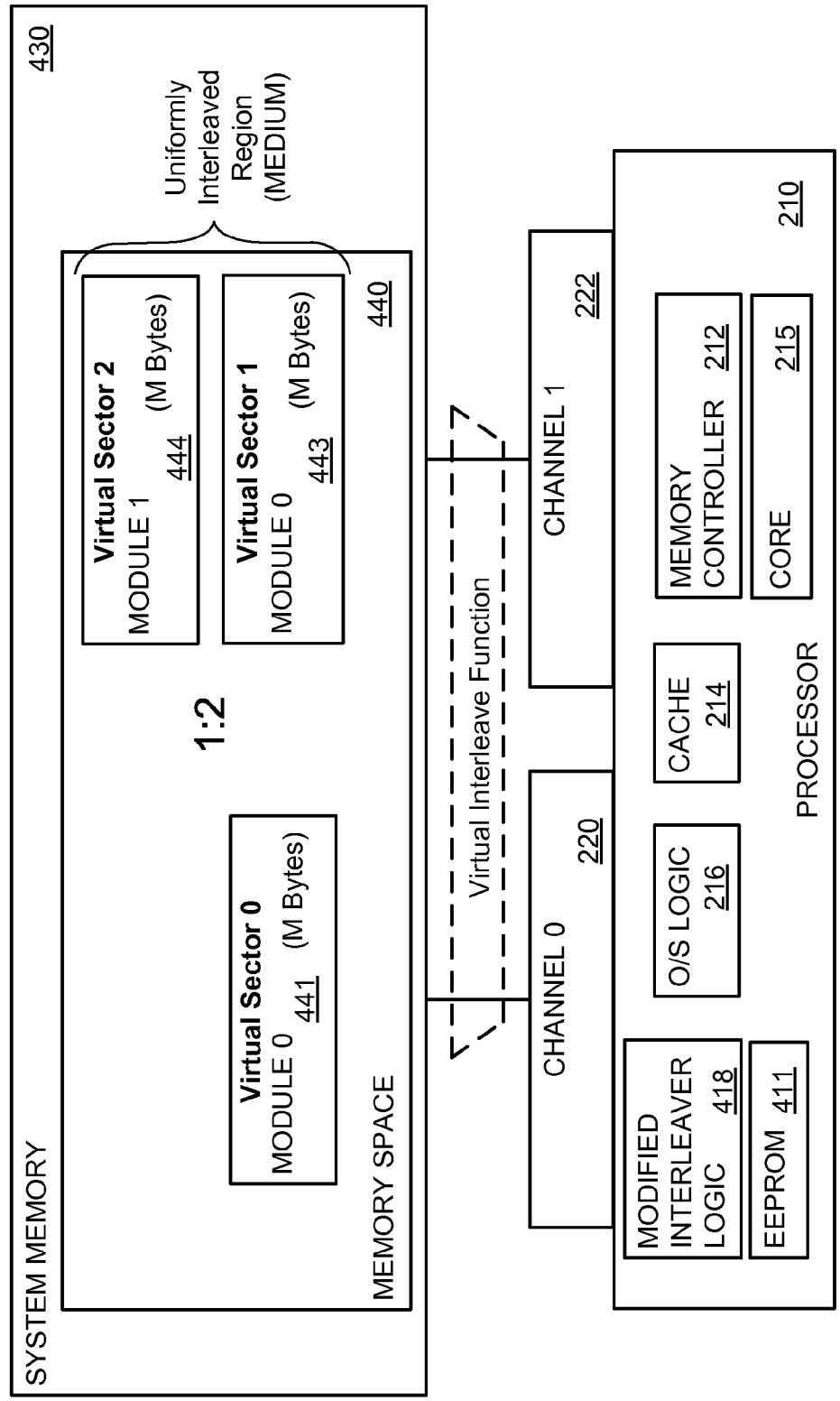
FIG. 4 is a schematic diagram of an example embodiment of the computing device of FIG. 1 with a set of virtual sectors distributed in a 1:2 ratio across two physical channels.

FIG. 4 is a schematic diagram of an example embodiment of the computing device of FIG. 1 with a set of virtual sectors distributed in a 1:2 ratio across two physical channels. As indicated in the example embodiment illustrated in FIG. 4, the memory space 440 is supported by a first memory module 441 coupled to the CPU 210 via channel 220 (channel 0) and two memory modules coupled to the CPU 210 via channel 222 (channel 1). The memory module 441, memory module 443, and the memory module 444 may be implemented with DRAM integrated circuits each having a data storage capacity of M bytes. With each of the memory modules 441, 443, 444 including the same circuit architecture and having the same capacity of M bytes, the channel 220 (channel 0) is coupled to M bytes whereas the channel 222 (channel 1) is coupled to 2M bytes. However, instead of using a partial interleave function to interleave data across two of the three available memory modules, the memory space 440 is divided into virtual sectors of equal capacity. As shown in FIG. 4 a virtual sector coincides with each of the memory module 441, memory module 443 and memory module 444. As indicated in FIG. 4 there is a 1:2 data access ratio between the physical channels 220.

The multiple-channel memory access architecture with an asymmetric storage capacity, as presented in FIG. 4, uses a virtual interleave function enabled by the modified interleaver logic 418. When the number of virtual sectors is odd, the modified interleaver logic 418 uses an odd-way spreading function to distribute data across the virtual sectors.

The electronically erasable programmable read only module (EEPROM) 411 is integrated with the processor CPU 210 to provide storage for programmable parameters and desired spreading functions to direct or adjust the modified interleaver logic 418 when distributing the data across the virtual channels. For example, a 3-way spreading function dynamically distributes memory access in a 1:2 ratio between channel 220 and channel 222 across the memory space 440. Consequently, the available capacity of the memory space 440 can be uniformly interleaved. In such arrangements, the rate of data transfers between the CPU 210 and the memory space 440 over the memory space 440 will be reduced from the maximum data transfer rate supported by matched memory modules across both channels but is faster and easier to manage than the slower non-interleaved data transfer supported by the partial interleaving method illustrated in FIG. 3. Since all memory accesses are performed at the same data transfer rate, the O/S logic 216 and or application programs executing in the core 215 can place data anywhere in the memory space 440.

In alternative embodiments, the virtual sector interleaving function may be programmed or adjusted to use more or fewer virtual sectors. In some arrangements, the number of virtual sectors used by the modified interleaver logic 418 may be less than the number of memory modules supporting the memory space 440. In some other arrangements, the number of virtual sectors used by the modified interleaver logic 418 may be more than the number of memory modules supporting the memory space 440. Such mismatches between the number of memory modules and the number of virtual sectors may ease the complexity of evenly dividing the available storage capacity into virtual sectors when memory modules having a different capacity are used to the support the memory space. A programmable virtual sector spreading function that distributes data across multiple channels allows the same CPU 210 to support both fully populated and partially populated memory channels.

An example spreading function may include a code for defining a memory access channel. For systems with three available channels an example spreading function such as the MOD function may be deployed. For example, to spread the address A[7:0] over 3 channels to map a total of 192 memory words, where each channel has 6-bit address ranges [5:0], mapping 64 memory words each, the outcome of A[7:0] MOD 3, can be used to select a channel. Hence, each channel will receive exactly a third of the 192 possible valid address patterns of A[7:0] in an interleaved manner. (Note that addresses 193 to 255 are invalid address patterns because that memory is unpopulated.) Then, a set of 5-bit intra-channel addressing functions A0, A1, A2 can be defined to select the memory locations within each channel. Since the subset of 64 memory locations of A[7:0] possible within each channel is known, one ordinarily skilled in the art using standard logic design and minimization techniques can design intra channel addressing functions of his liking that map these 64 addresses to the 64 unique memory locations within each channel.

Figure 5:
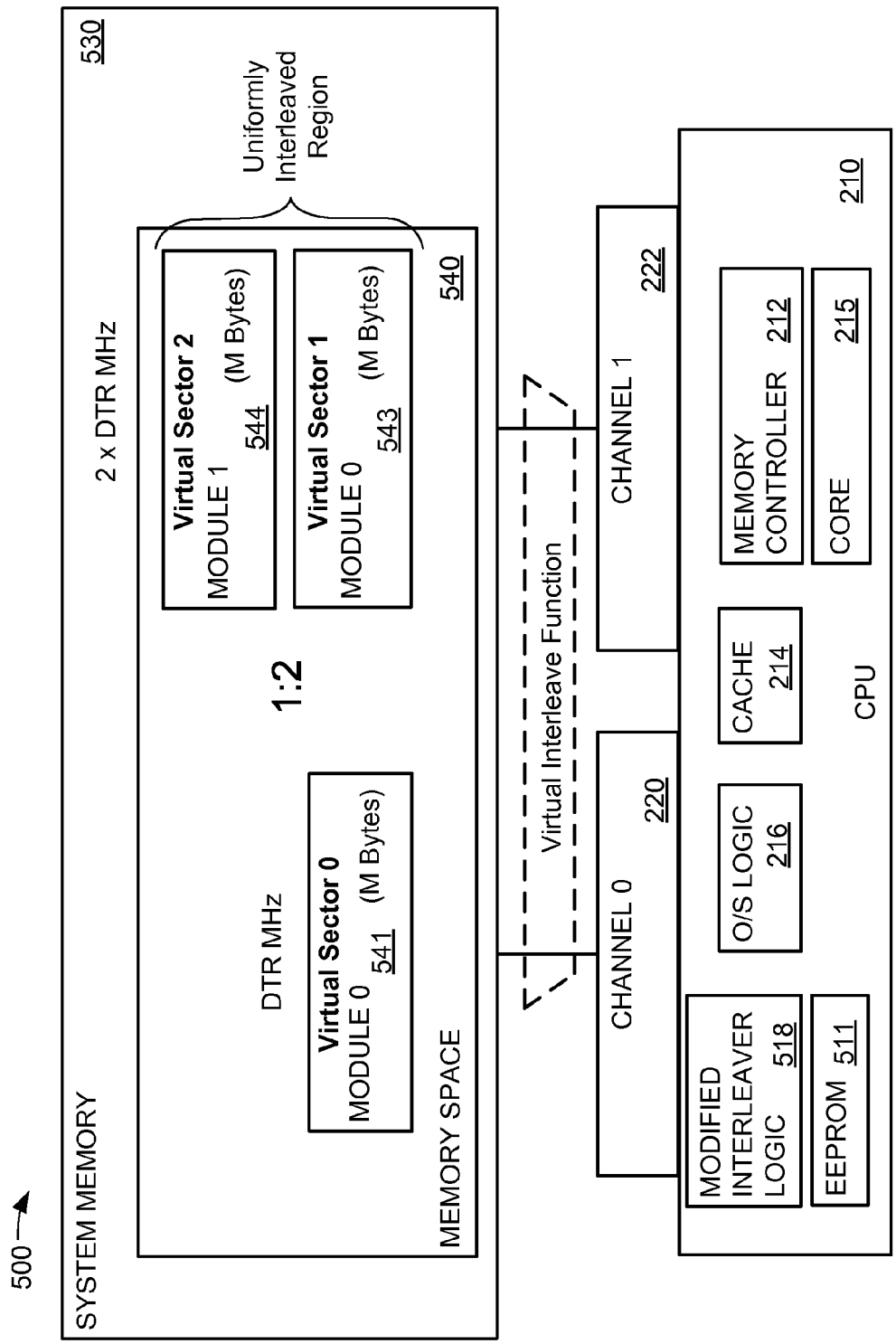
FIG. 5 is a schematic diagram of an example embodiment of the computing device of FIG. 1 with a set of virtual sectors distributed in a 1:2 ratio across two physical channels operated at different data transfer rates.

FIG. 5 is a schematic diagram of an example embodiment of the computing device of FIG. 1 with a set of virtual sectors distributed in a 1:2 ratio across two physical channels operated at different data transfer rates. As indicated in the example embodiment illustrated in FIG. 5, the memory space 540 is supported by a first memory module 541 coupled to the CPU 210 via channel 220 (channel 0) and two memory modules coupled to the CPU 210 via channel 222 (channel 1). The memory module 541, memory module 543, and the memory module 544 may be implemented with DRAM integrated circuits each having a data storage capacity of M bytes. With each of the memory modules 541, 543, 544 including the same circuit architecture and having the same capacity of M bytes, the channel 220 (channel 0) is coupled to M bytes whereas the channel 222 (channel 1) is coupled to 2M bytes. However, instead of using a virtual interleave function to interleave data across three virtual sectors alone, as shown in FIG. 4, the memory space 540 is divided into virtual sectors of equal capacity and the modified interleaver logic 518 uses a first data transfer rate when communicating over channel 220 and a second data transfer rate when communicating over channel 222. In an example embodiment, the memory module 541 is a low-power double data rate 2 (LPDDR2) memory element with a data capacity of 256 MBytes and capable of operating at a clock frequency of 266 MHz. In this same example, the memory module 543 and the memory module 544 are LPDDR2 memory elements with the same data capacity but are capable of operating at a clock frequency of 533 MHz. Consequently, the example embodiment achieves a uniform bandwidth across the memory space 540 while allowing for potential cost savings associated with the asymmetric data storage capacity across the physical channels. While the example embodiment includes a 1:2 capacity ratio across the channels, a 1:2 ratio in the virtual sectors distributed about the channels and a 1:2 ratio in clock frequencies, the clock frequencies are independent of the virtual sector ratio and the number of virtual sectors coupled to each channel.

As shown in FIG. 5, a virtual sector coincides with each of the memory module 541, memory module 543 and memory module 544. As further indicated in FIG. 5 there is a 1:2 data access ratio between the physical channels 220, 222. In addition, the memory modules 543, 544 in communication with channel 222 define a region of the memory space 540 where the modified interleaver logic 518 can uniformly interleave data at the highest data transfer rate supported by the memory modules (or a maximum data transfer rate) and the channel or a desired data transfer rate that is slower than the maximum data transfer rate. In the illustrated embodiment, channel 222 communicates data with the CPU 210 at a data transfer rate that is twice the data transfer rate supported by channel 220.

The EEPROM 511 is integrated with the processor CPU 210 to provide storage for programmable parameters and desired spreading functions to direct or adjust the modified interleaver logic 518 when distributing the data across the virtual channels. In some arrangements the EEPROM 511 will include one or more parameters that identify the number of virtual sectors, the number of physical communication channels, and the data transfer rates to use when spreading data across the memory space 540. In some arrangements, the data transfer rates used to communicate data across the channels between the CPU 210 and the memory space 540 may be identified as functions of the other channel or channels.

Figure 6:
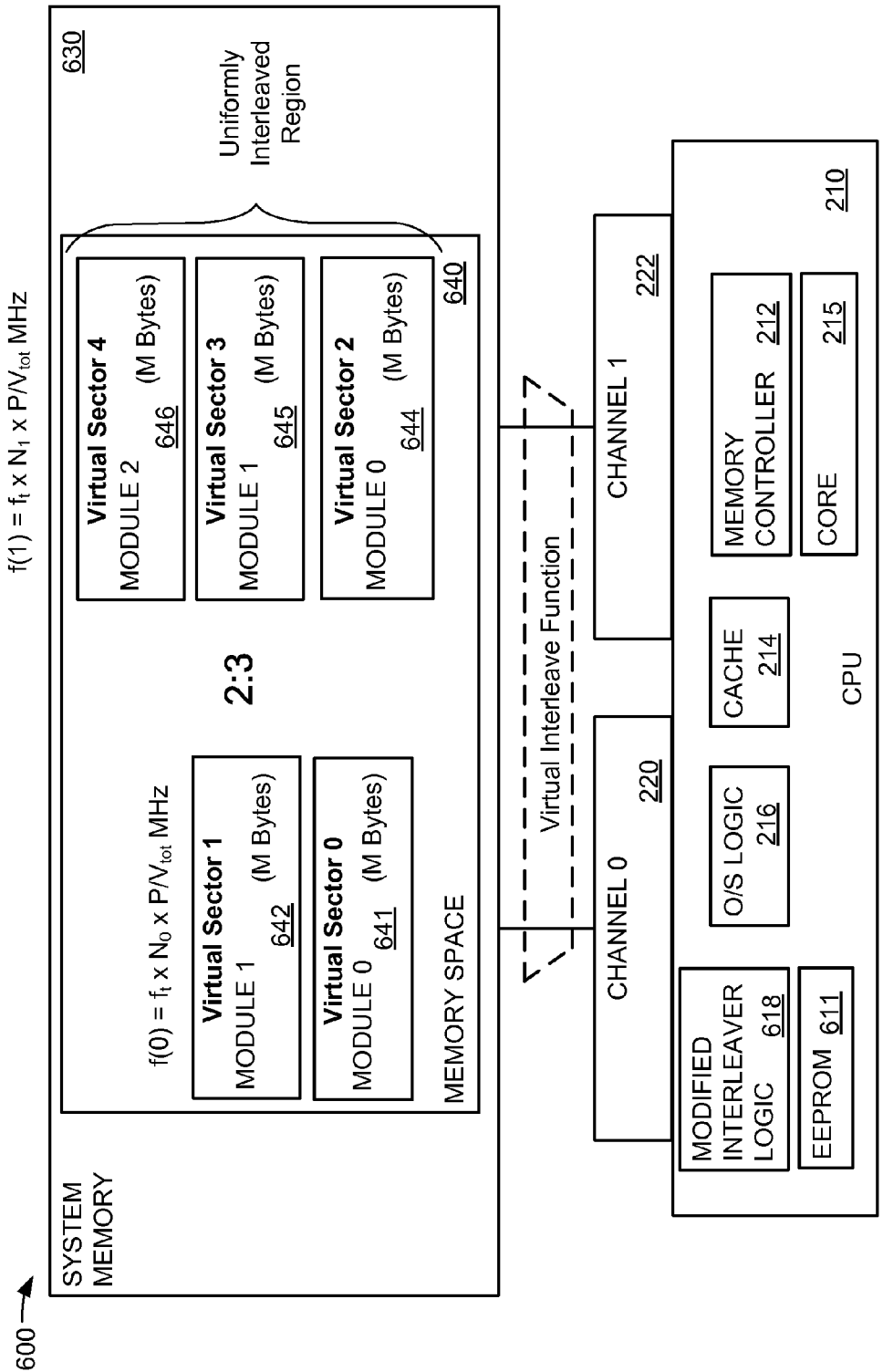
FIG. 6 is a schematic diagram of an example embodiment of the computing device of FIG. 5 with a relatively larger set of virtual sectors distributed in a 2:3 ratio across two physical channels operated at different data transfer rates.

FIG. 6 is a schematic diagram of an example embodiment of the computing device of FIG. 5 with a relatively larger set of virtual sectors distributed in a 2:3 ratio across two physical channels operated at different data transfer rates. As indicated in the example embodiment illustrated in FIG. 6, the memory space 640 is supported by a memory module 641 and a memory module 642 coupled to the CPU 210 via channel 220 (channel 0) and memory module 644, memory module 645 and memory module 646 coupled to the CPU 210 via channel 222 (channel 1). The memory modules 641, 642, 644, 645, 646 may be implemented with DRAM integrated circuits each having a data storage capacity of M bytes. With each of the memory modules 641, 642, 644, 645, 646 including the same circuit architecture and having the same capacity of M bytes, the channel 220 (channel 0) is coupled to 2M bytes of storage capacity whereas the channel 222 (channel 1) is coupled to 3M bytes of storage capacity. Here, the memory space 640 is divided into five virtual sectors of equal capacity and the modified interleaver logic 618 uses a first data transfer rate when communicating over channel 220 and a second data transfer rate when communicating over channel 222.

As indicated in FIG. 6, the first and second data transfer rates (f(0), f(1)) can be determined as a function of a data transfer rate deployed in a fully interleaved system, $f_t$, the number of virtual sectors in the channel ($N_0$, $N_1$) and the ratio of the number of physical channels to the total number of virtual sectors ($P/V_{tot}$) in the memory space 640. Specifically, first and second data transfer rates that permit the memory space 640 to achieve the bandwidth provided by a matched capacity fully-interleaved storage system can be determined by the product of the data transfer frequency of the fully interleaved system, the number of virtual sectors in the channel and the ratio of the number of physical channels to the total number of virtual sectors deployed by the system 600.

In an example embodiment, the memory module 641 and the memory module 642 are DRAM element search with a data capacity of 256 MBytes and capable of operating at a clock frequency of 320 MHz. In this same example, the memory module 644, memory module 645 and the memory module 646 are DRAM elements with the same data capacity of 256 Mbytes but capable of operating at a clock frequency of 480 MHz. Consequently, the example embodiment achieves a uniform bandwidth across the memory space 640 while allowing for potential cost savings associated with the asymmetric data storage capacity across the physical channels. While the example embodiment includes a 2:3 capacity ratio across the channels, a 2:3 ratio in the virtual sectors distributed about the channels and a 2:3 ratio in clock frequencies, the clock frequencies are independent of the virtual sector ratio and the number of virtual sectors coupled to each channel.

As shown in FIG. 6, a virtual sector coincides with each of the memory modules 641, 642, 644, 645, 646. In addition, the memory modules 644-646 in communication with channel 222 define a region of the memory space 640 where the modified interleaver logic 618 can uniformly interleave data at the highest rate supported by the memory modules and the channel or a desired data transfer rate that is slower than the maximum data transfer rate. In the illustrated embodiment, channel 222 communicates data with the CPU 210 at a data transfer rate that is one and half times the data transfer rate supported by channel 220.

The EEPROM 611 is integrated with the processor CPU 210 to provide storage for programmable parameters and desired spreading functions to direct or adjust the modified interleaver logic 618 when distributing the data across the virtual channels. In some arrangements the EEPROM 611 will include one or more parameters that identify the number of virtual sectors, the number of physical communication channels, and the data transfer rates to use when spreading data across the memory space 640. In some arrangements, the data transfer rates used to communicate data across the channels between the CPU 210 and the memory space 640 may be identified as functions of the other channel or channels.

Figure 7:
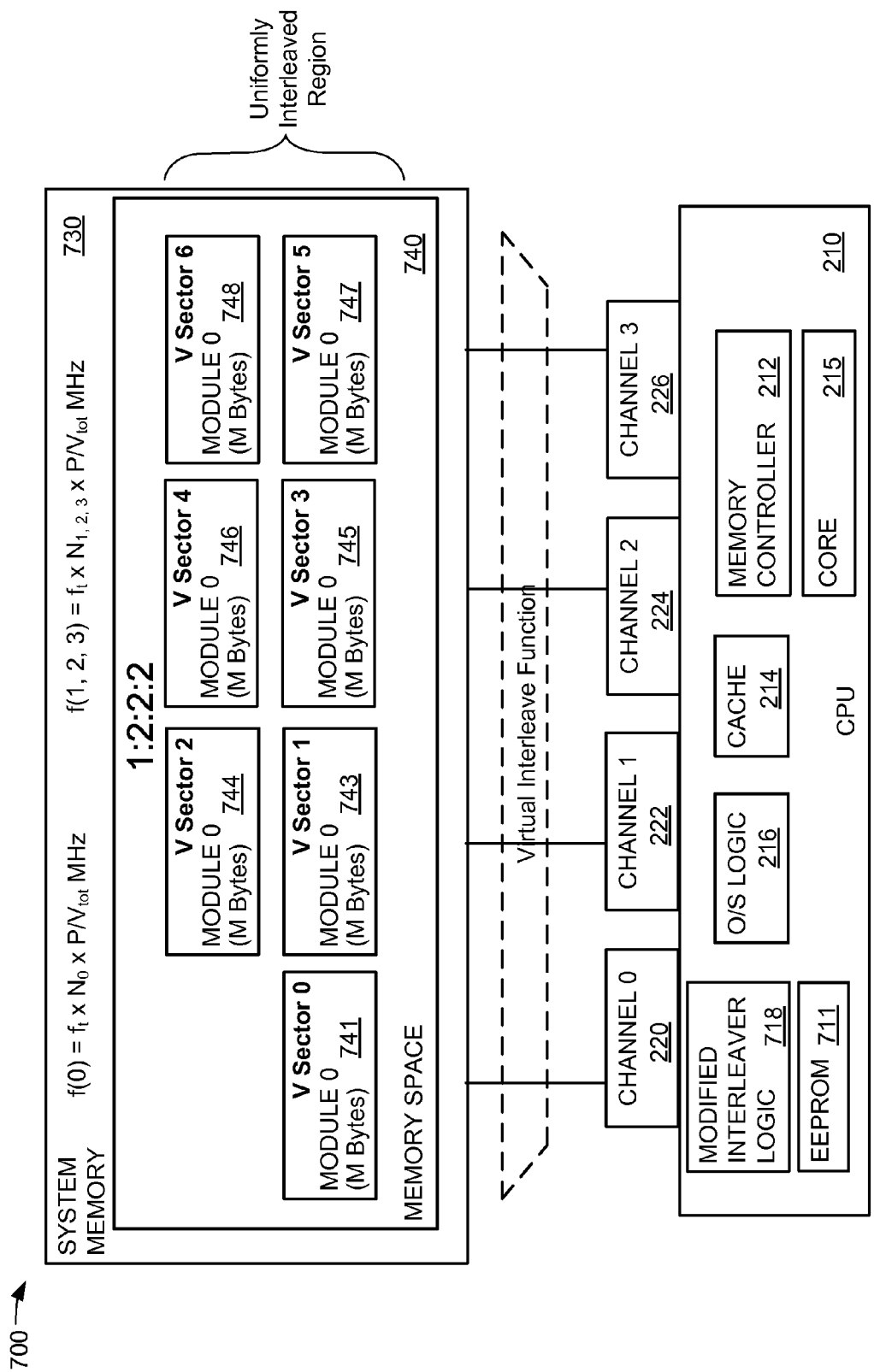
FIG. 7 is a schematic diagram of an example embodiment of a computing device with an alternative set of virtual sectors distributed in a 1:2:2:2 ratio across 4 physical channels operated at two different data transfer rates to achieve an equivalent data bandwidth of a symmetrically populated memory space.

FIG. 7 is a schematic diagram of an example embodiment of a computing device with an alternative set of virtual sectors distributed in a 1:2:2:2 ratio across 4 physical channels operated at two different data transfer rates to achieve an equivalent data bandwidth of a symmetrically populated memory space. As indicated in the example embodiment illustrated in FIG. 7, the memory space 740 is supported by a memory module 741 coupled to the CPU 210 via channel 220 (channel 0), a memory module 743 and a memory module 744 coupled to the CPU 210 via channel 222 (channel 1), a memory module 745 and a memory module 746 coupled to the CPU 210 via channel 224 (channel 2), a memory module 747 and a memory module 748 coupled to the CPU 210 via channel 226 (channel 3). The memory modules 741, 743, 744, 745, 746, 747, 748 may be implemented with DRAM integrated circuits each having a data storage capacity of M bytes. With each of the memory modules 741, 743-748 including the same circuit architecture and having the same capacity of M bytes, the channel 220 (channel 0) is coupled to M bytes of storage capacity whereas the channels 222, 224, 226 (Channels 1-3) are coupled to 2M bytes of storage capacity. Here, the memory space 740 is divided into seven virtual sectors of equal capacity and the modified interleaver logic 718 uses a first data transfer rate when communicating over channel 220 and a second data transfer rate when communicating over channels 222, 224, 226.

As indicated in FIG. 7, first and second data transfer rates (f(0), f(1, 2, 3)) can be determined as a function of a data transfer rate deployed in a fully interleaved system, $f_f$, the number of virtual sectors in the channel ($N_0$, $N_{1,2,3}$) and the ratio of the number of physical channels to the total number of virtual sectors ($P/V_{tot}$) in the memory space 740. Specifically, first and second data transfer rates that permit the memory space 740 to achieve the bandwidth provided by a matched capacity fully-interleaved storage system can be determined by the product of the data transfer frequency of the fully interleaved system, the number of virtual sectors in the channel and the ratio of the number of physical channels to the total number of virtual sectors deployed by the system 700.

In an example embodiment, the memory module 741 is a DRAM element with a data capacity of 256 MBytes and capable of operating at a clock frequency of about 229 MHz. In this same example, the memory modules 743-748 are DRAM elements with the same data capacity of 256 Mbytes but capable of operating at a clock frequency of about 457 MHz. Consequently, the example embodiment achieves a uniform bandwidth across the memory space 740 while allowing for potential cost savings associated with the asymmetric data storage capacity across the four physical channels. While the example embodiment includes a 1:2:2:2 capacity ratio across the four channels, a 1:2:2:2 ratio in the virtual sectors distributed about the channels and about a 1:2 ratio in clock frequencies, the clock frequencies may be applied independent of the virtual sector ratio and the number of virtual sectors coupled to each channel.

As shown in FIG. 7, a virtual sector coincides with each of the memory modules 741, 743-748. In addition, the memory modules 743-748 in communication with channels 222, 224, 226 define a region of the memory space 740 where the modified interleaver logic 718 can uniformly interleave data at the highest rate supported by the memory modules and the channel or a desired data transfer rate that is slower than the maximum data transfer rate. In the illustrated embodiment, each of channels 222, 224, 226 communicates data with the CPU 210 at a data transfer rate that is about twice the data transfer rate supported by channel 220.

The EEPROM 711 is integrated with the processor CPU 210 to provide storage for programmable parameters and desired spreading functions to direct or adjust the modified interleaver logic 718 when distributing the data across the virtual channels. In some arrangements the EEPROM 711 will include one or more parameters that identify the number of virtual sectors (e.g., seven), the number of physical communication channels (e.g., 4), and the data transfer rates (229 MHz, 457 MHz) to use when spreading data across the memory space 740.

While the illustrated embodiments include an even number of channels and an odd number of virtual sectors distributed over an odd number of memory modules, many other arrangements are possible that result in an asymmetric memory capacity across multiple channels. For example, an even number of memory modules can be deployed across an odd number of channels. In one such arrangement, 4 total memory modules may be distributed across three channels (1:1:2, 1:2:1, or 2:1:1). When the memory modules share the same storage capacity, the number of virtual sectors may be equal to or less than the storage capacity of the memory modules. By way of further example, asymmetry in storage capacity across channels can be the result of deploying memory modules having different storage capacities across an even number of channels. In one such arrangement, a first memory module having a storage capacity of 1 GB is coupled to a first channel and a second memory module having a storage capacity of 2 GB is coupled to a second channel. In this arrangement, the interleaver function may respond by distributing the data equally across three virtual sectors of 1 GB each. These and other arrangements with asymmetric storage capacities distributed across multiple channels can be improved by the described interleaving functions and other functions that take advantage of using virtual sectors to access the available storage in a computing device.

Figure 8:
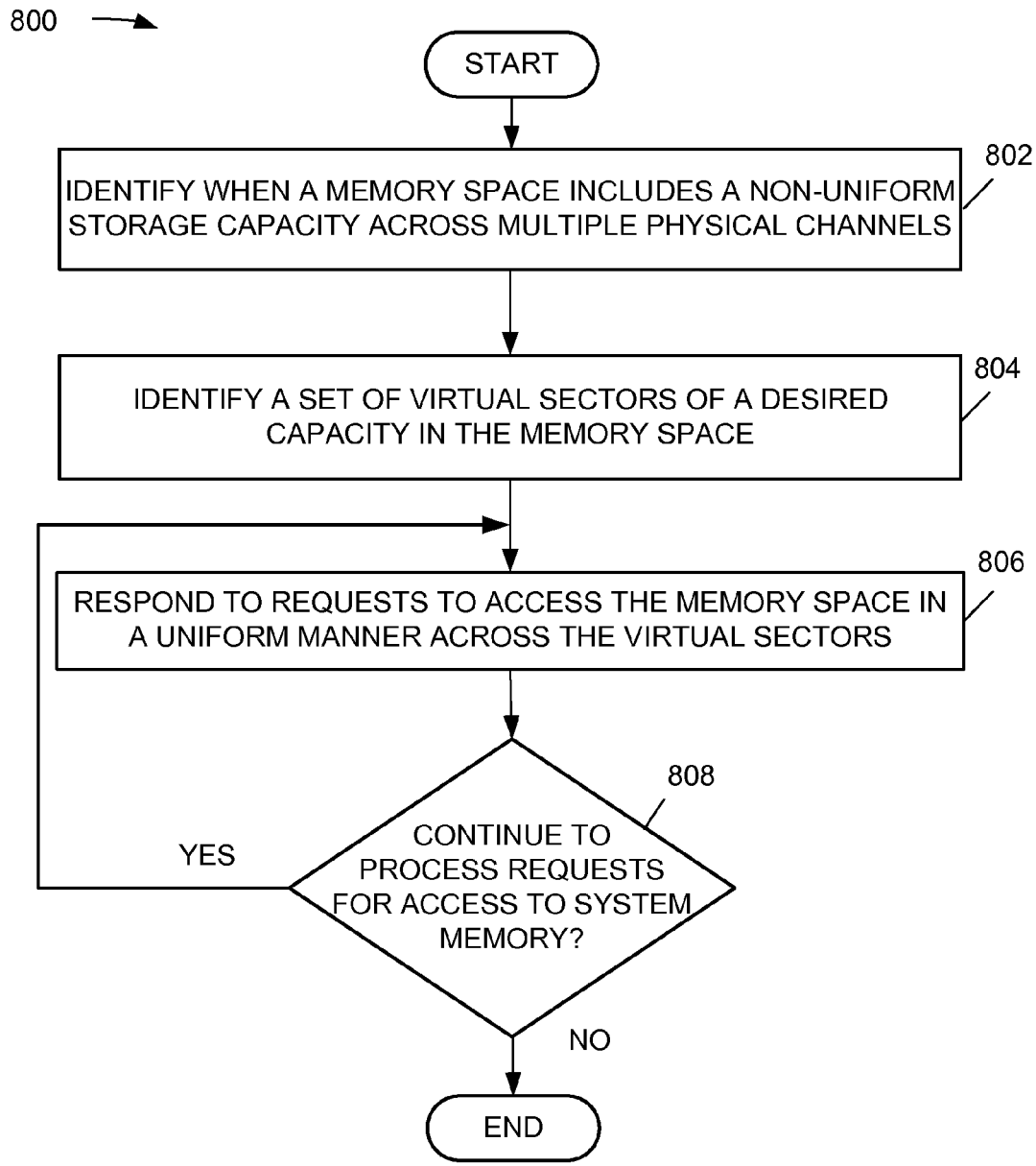
FIG. 8 is a flowchart illustrating an example embodiment of a method for uniformly interleaving memory accesses across physical channels of a memory space with a non-uniform storage capacity.

FIG. 8 is a flowchart illustrating an example embodiment of a method 800 for uniformly interleaving memory accesses across physical channels of a memory space with a non-uniform storage capacity. In block 802, a memory controller or other sensor associated with a computing system identifies when a memory space includes a non-uniform data storage capacity across multiple physical channels between a CPU 210 and a system memory. In block 804, a programmable interleaver or interleaver logic identify a set of virtual sectors of a desired storage capacity in the memory space. In block 806, the interleaver or interleaver logic responds to requests to access the memory space in a uniform manner across the virtual sectors or a portion of the virtual sectors in the memory space. In decision block 808, a determination is made to continue to process requests to access the memory space using the interleaver or interleaver logic. When the response is affirmative as indicated by the flow control arrow labeled "Yes," the functions in block 806 and 808 are repeated. Otherwise, as indicated by the flow control arrow labeled "No" exiting decision block 808 the method 800 terminates.

Certain steps in the processes or process flows described in this specification naturally precede others for the invention to function as described. However, the invention is not limited to the order of the steps described if such order or sequence does not alter the functionality of the invention. That is, it is recognized that some steps may be performed before, after, or in parallel (substantially simultaneously) with other steps without departing from the scope of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored as one or more instructions or code on a computer-readable medium, such as a non-transitory processor-readable medium. Computer-readable media include data storage media.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present systems and methods, as defined by the following claims.

What is claimed is:

1. A method for uniformly interleaving memory accesses to a memory space having a non-uniform storage capacity across physical channels, the method comprising:
   identifying when a multiple-channel memory architecture is provided an asymmetric storage capacity across the physical channels;
   using logic responsive to the identifying to define a number of virtual sectors of equal capacity; and
   applying an interleaving function via an interleaver that accesses the asymmetric storage capacity uniformly across the virtual sectors in response to requests to access the memory space, wherein the number of virtual sectors of equal capacity is fewer in number than a number of memory modules supporting the memory space.

2. The method of claim 1, wherein a number of the physical channels is even and the number of virtual sectors of equal capacity is odd.

3. The method of claim 1, wherein a number of the physical channels is odd and the number of virtual sectors of equal capacity is even.

4. The method of claim 1, wherein the applying an interleaving function includes applying a spreading function.

5. The method of claim 4, wherein the spreading function dynamically distributes memory accesses in a defined ratio between physical channels over the memory space.

6. The method of claim 1, wherein the number of virtual sectors of equal capacity is greater than a number of memory modules supporting the memory space.

7. The method of claim 1, wherein the memory space is supported by an odd number of memory modules of the same storage capacity.

8. The method of claim 1, wherein the memory space is supported by an even number of memory modules with at least one memory module having a storage capacity that is different from the storage capacity of the remaining memory modules.

9. The method of claim 1, wherein operations that access the memory space are supported at a data transfer rate to each of the physical channels that exceeds a non-interleaved data transfer rate.

10. The method of claim 1, wherein operations that access the memory space via a first physical channel are supported at a first data transfer rate and operations that access the memory space via a second physical channel are supported at a second data transfer rate that is different from the first data transfer rate.

11. The method of claim 10, wherein the first data transfer rate is a function of the second data transfer rate.

12. The method of claim 11, wherein the first data transfer rate and the second data transfer rate are determined based on a number of virtual sectors supported by a physical channel.

13. A computing device, comprising:
   an interleaver arranged on a bus in communication with a processor and a system memory, the interleaver configured to identify locations in a memory space supported by at least two physical channels, the interleaver responsive to logic that identifies virtual sectors having a desired storage capacity; and
   at least one memory module coupled to the at least two physical channels, respectively, the memory space having a non-uniform storage capacity between the physical channels, wherein the interleaver accesses the non-uniform storage capacity uniformly across the virtual sectors in response to requests to access the memory space, wherein a number of virtual sectors of equal capacity is responsive to a parameter received in the processor.

14. The computing device of claim 13, further comprising:
   a memory controller that signals the interleaver when the at least two physical channels are provided a disparate storage capacity between the at least two physical channels.

15. The computing device of claim 13, wherein the interleaver applies an N-way spreading function, where N is an integer, the N-way spreading function dynamically distributing memory accesses in a defined ratio between physical channels over the memory space.

16. The computing device of claim 13, wherein a number of virtual sectors of equal capacity is fewer in number than a number of memory modules supporting the memory space.

17. The computing device of claim 13, wherein the memory space is supported by an odd number of memory modules of the same storage capacity.

18. The computing device of claim 13, wherein operations that access the memory space are supported at a data transfer rate to each of the physical channels that exceeds a non-interleaved data transfer rate.

19. The computing device of claim 13, wherein operations that access the memory space via a first physical channel are supported at a first data transfer rate and operations that access the memory space via a second physical channel are supported at a second data transfer rate that is different from the first data transfer rate.

20. The computing device of claim 13, wherein a first data transfer rate is applied across a first set of physical channels and a second data transfer rate is applied across a second set of physical channels.

21. The computing device of claim 20, wherein the first data transfer rate and the second data transfer rate are determined as a function of a number of virtual sectors supported by a physical memory channel.

22. A computing device, comprising:
   means for identifying a memory space arranged with non-uniform storage capacity across a multiple-channel memory access architecture;
   means for identifying a number of virtual sectors of equal storage capacity in the memory space;
   means for applying an interleaving function that uniformly accesses the virtual sectors in response to requests to access the memory space, wherein a number of virtual sectors of equal capacity is fewer in number than a number of memory modules supporting the memory space.

23. The computing device of claim 22, wherein the memory space is supported by an integer number of memory modules.

24. The computing device of claim 23, wherein at least one memory module has a storage capacity that is different than the storage capacity of the remaining memory modules.

25. The computing device of claim 22, wherein the means for applying an interleaving function applies an N-way spreading function, where N is an integer.

26. The computing device of claim 25, wherein the N-way spreading function dynamically distributes memory accesses in a defined ratio between physical channels over the memory space.

27. The computing device of claim 22, wherein a number of virtual sectors of equal capacity is responsive to a parameter received in a processor.

28. The computing device of claim 22, wherein the memory space is supported by an odd number of memory modules of the same storage capacity.

29. The computing device of claim 22, wherein operations that access the memory space are supported at a data transfer rate to each of the physical channels that exceeds a non-interleaved data transfer rate.

30. The computing device of claim 22, wherein operations that access the memory space via a first physical channel are supported at a first data transfer rate and operations that access the memory space via a second physical channel are supported at a second data transfer rate that is different from the first data transfer rate.

31. The computing device of claim 30, wherein the first data transfer rate is a function of the second data transfer rate.

32. The computing device of claim 22, wherein a first data transfer rate is applied across a first set of physical channels and a second data transfer rate is applied across a second set of physical channels.

33. The computing device of claim 32, wherein the first data transfer rate and the second data transfer rate are determined as a function of a number of virtual sectors supported by a physical channel.

34. A non-transitory processor-readable medium having stored thereon processor instructions that when executed direct the processor to perform functions, comprising:
   receiving an indication that a multiple-channel memory architecture is presently populated with memory modules that provide an asymmetric storage capacity across multiple channels;
   in response to the indication, identifying a number of virtual sectors of equal capacity; and
   applying an interleaving function that accesses the asymmetric storage capacity uniformly across the virtual sectors in response to requests to access the memory space, wherein operations that access the memory space are supported at a data transfer rate to each of the physical channels that exceeds a non-interleaved data transfer rate.

35. The non-transitory processor-readable medium of claim 34, wherein at least one memory module has a storage capacity that is different than the storage capacity of the remaining memory modules.

36. The non-transitory processor-readable medium of claim 34, wherein the applying an interleaving function includes applying an N-way spreading function.

37. The non-transitory processor-readable medium of claim 36, wherein the N-way spreading function dynamically distributes memory accesses in a defined ratio between physical channels over the memory space.

38. The non-transitory processor-readable medium of claim 34, wherein the number of virtual sectors of equal capacity is programmable.

39. The non-transitory processor-readable medium of claim 38, wherein the number of virtual sectors of equal capacity is fewer in number than a number of memory modules supporting the memory space.

40. The non-transitory processor-readable medium of claim 34, wherein the memory space is supported by an odd number of memory modules of the same storage capacity.

41. The non-transitory processor-readable medium of claim 34, wherein operations that access the memory space via a first physical channel are supported at a first data transfer rate and operations that access the memory space via a second physical channel are supported at a second data transfer rate that is different from the first data transfer rate.

42. The non-transitory processor-readable medium of claim 11, wherein the first data transfer rate is applied across a first set of physical channels and the second data transfer rate is applied across a second set of physical channels.

43. The method of claim 1, wherein the number of virtual sectors of equal capacity is programmable.

* * * * *